(12) United States Patent
Whinnery, Jr. et al.

(10) Patent No.: US 8,466,207 B1
(45) Date of Patent: Jun. 18, 2013

(54) METHOD FOR PROVIDING A LOW DENSITY HIGH STRENGTH POLYURETHANE FOAM

(75) Inventors: Leroy L. Whinnery, Jr., Danville, CA (US); Steven H. Goods, Livermore, CA (US); Dawn M. Skala, Fremont, CA (US); Craig C. Henderson, Falls Church, VA (US); Patrick N. Keifer, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 1129 days.

(21) Appl. No.: 11/712,283

(22) Filed: Feb. 27, 2007

Related U.S. Application Data (60) Provisional application No. 60/778,508, filed on Mar. 1, 2006.

(51) Int. Cl.
*C08G 18/28* (2006.01)

(52) U.S. Cl.
USPC ........... 521/159; 521/128; 521/129; 521/130; 521/131; 521/170; 521/174

(58) Field of Classification Search
USPC .................. 521/128, 129, 130, 131, 159, 170, 521/174; 252/182.27
See application file for complete search history.

(56) References Cited

U.S. PATENT DOCUMENTS

| | | | | |
|---|---|---|---|---|
| 4,116,893 | A | | 9/1978 | Flanagan ........................ 521/137 |
| 4,190,712 | A | | 2/1980 | Flanagan ........................ 521/137 |
| 4,212,954 | A | | 7/1980 | Nomura et al. ................ 521/159 |
| 4,696,954 | A | | 9/1987 | Pritchard et al. .............. 521/167 |
| 4,722,946 | A | | 2/1988 | Hostettler ...................... 521/158 |
| 5,968,995 | A | * | 10/1999 | Rizk et al. ..................... 521/159 |
| 6,077,877 | A | * | 6/2000 | Gerkin et al. ................. 521/129 |
| 6,376,567 | B1 | * | 4/2002 | Werner et al. ................. 521/159 |
| 6,521,673 | B1 | * | 2/2003 | Brown .......................... 521/130 |

OTHER PUBLICATIONS

Bicerano, J., "Prediction of Polymer Properties, Second Edition, Revised and Expanded," Marcel Dekker, Inc., Publisher, 270 Madison Avenue, New York, NY 10016, Copyright 1996, pp. 45-49 and 87-89.

* cited by examiner

*Primary Examiner* — John Cooney
(74) *Attorney, Agent, or Firm* — Timothy P. Evans (57) ABSTRACT

Disclosed is a method for making a polyurethane closed-cell foam material exhibiting a bulk density below 4 lbs/ft$^3$ and high strength. The present embodiment uses the reaction product of a modified MDI and a sucrose/glycerine based polyether polyol resin wherein a small measured quantity of the polyol resin is "pre-reacted" with a larger quantity of the isocyanate in a defined ratio such that when the necessary remaining quantity of the polyol resin is added to the "pre-reacted" resin together with a tertiary amine catalyst and water as a blowing agent, the polymerization proceeds slowly enough to provide a stable foam body.

4 Claims, 8 Drawing Sheets

METHOD FOR PROVIDING A LOW DENSITY HIGH STRENGTH POLYURETHANE FOAM

CROSS REFERENCE TO RELATED APPLICATIONS

This application claims priority to prior provisional U.S. Patent Application Ser. No. 60/778,508 originally filed Mar. 1, 2006 entitled "METHOD FOR PROVIDING A LOW DENSITY HIGH STRENGTH POLYURETHANE FOAM" from which benefit is claimed.

STATEMENT OF GOVERNMENT SUPPORT

The United States Government has a paid-up license in this invention and the right in limited circumstances to require the patent owner to license others on reasonable terms as provided for by the terms of contract No. DE-AC04-94AL85000 awarded by the U.S. Department of Energy to Sandia Corporation.

BACKGROUND OF THE INVENTION

1. Field of the Invention

The invention generally relates to a process for making a low density, rigid polyurethane foam. More particularly, the embodiment of the present invention relates to closed-cell, water blown, rigid polyurethane foams which may be processed with a low bulk density while providing enhanced mechanical performance and energy absorbing capability heretofore unachievable with urethane formulations that do not use toluene diisocyanate.

2. Prior Art

In many applications, polyurethane foams are used to absorb, or at least mitigate, the effects of high acceleration loads. In particular, low density polyurethane foams are widely used as a packing media while rigid, high density polyurethane foams are used in the construction of automobile bumpers and to stiffen door support frames. Additionally, many polyurethane foams currently using TDI (toluene diisocyanate) and MDI (diphenylmethane diisocyanate) prepolymers have not been intentionally optimized with respect to their toughness or impact properties. As such, there has been a growing need to develop polyurethane foam systems with improved energy absorbing capacity.

For example, U.S. Pat. No. 4,722,946 describes the production of energy attenuating viscoelastic polyurethane elastomers and foams, comprising mixtures of linear and branched polyol intermediates and polyisocyanates in the presence of a catalyst. Additionally, U.S. Pat. No. 4,696,954 describes the preparation of molded polyurethane foams characterized by high impact strength and good thermal stability. Furthermore, some limited success has been had with certain formulations using water as a blowing agent, and containing a polymer polyol (graft polyol) as necessary elements of the invention. U.S. Pat. Nos. 4,190,712, 4,212,954, and 4,116,893 disclose formulations for flexible or viscoelastic foams.

While many energy absorbing polyurethane foam compositions are known in the art, there is need for foam compositions that are simple and utilize commercially available materials producing light weight foams having superior mechanical properties.

SUMMARY OF THE INVENTION

The present embodiment relates to a process for making low density polyurethane foam having enhanced mechanical performance and energy absorbing capability without using a TDI isocyanate.

More particularly, the polyurethane foam of the present embodiment comprises the reaction product of a prior prepared mixture consisting of a modified methylene diisocyanate and a small fraction of the quantity of a sucrose/glycerine based polyether polyol resin necessary for foam formation, the remaining necessary fraction of the polyether polyol resin, an appropriate catalyst consisting of one or more tertiary amines, a surfactant, and water as the blowing agent. In addition, the isocyanate and polyol resins are each chosen to have a low number of functional groups per monomer and a moderately high number of rotational degrees of freedom.

It is therefore an object of an embodiment of this invention to provide a method for making polyurethane foam exhibits high strength and impact resistance as well as a low bulk density.

It is another object to provide a method for making a polyurethane foam article with a bulk density of less than about 4 lbs./ft$^3$.

Yet another object to provide a method for making a polyurethane foam article with a bulk density of between 2 lbs./ft$^3$ and 3 lbs./ft$^3$.

Still another object is to provide a method for making a polyurethane foam article capable of sustaining an impact load to a true strain of about 1 at a strain rate of up to 80 inches/inch-sec without structural failure.

A further object of this embodiment is to provide a method for making a polyurethane foam article capable of providing a low rate strain behavior essentially identical to a foam member provided by prior art polyurethane composition.

Still other objects and advantages of the present embodiment will be ascertained from a reading of the following detailed description and the appended claims.

DETAILED DESCRIPTION OF THE INVENTION

The polyurethane formulation of the present embodiment of the invention was developed in an attempt to achieve a low density high strength polyurethane foam without the use of toluene diisocyanate resins. Our initial attempts were frustrated due to the apparent low strength of rising foam: some attempts resulted in the foam collapsing, some in the foam breaking or splitting apart. It was postulated that the expansion process was proceeding too quickly relative to the polymerization reaction, but that if the isocyanate resin was "pre-gelled" then the polymerization reaction would have a head start on the gas generation reaction and thereby allow time for the gel to develop enough strength to support the weight of the expanding foam.

In addition, because a moderate strength polyurethane foam exhibiting enhanced toughness was desired, it was further postulated that such a foam could be obtained by formulating a polymer comprising constituent materials that when reacted would provide a polymer that exhibits a moderate degree of "flexibility" (by which we mean the relative of pliancy or "bendability" attributed to the polymer chain after polymerization), such as those recited and taught by commonly owned, co-pending U.S. patent application Ser. No. 11/223,470, herein incorporated by reference. Moreover, it was further postulated that the degree to which a given polymer is "flexible" would be quantified by parameters related to its molecular structure. In particular, a parameter which measures the number of reactive functional groups per monomer (fcn) would be expected to provide an indication of flexibility (in the sense as it is described above) since it is related to the cross-linker density of a reacted polymer. Furthermore, a parameter known as "$N_{rot}$," first introduced by J. Bicerano (*Predication of Polymer Properties, Second Edition, Revised and Expanded*, Marcel Dekker, Inc., Publishers, 1996, New York), was shown to be related to the local kinematic behavior of large molecules and could be used as a way to help characterize the behavior of organic monomers/polymers.

Values for fcn are provided by the manufacturers of the various monomer/polymer constituent materials identified herein below in their technical bulletins and is therefore readily available. A determination of $N_{rot}$, however, requires knowledge of the molecular structure of the particular constituent material involved and a computation of the number of rotational degrees of freedom of the constituent parts of the molecule being characterized based on a set of rules developed by Bicerano. The former is also readily available from the manufacturer of the constituent materials and from this the latter can be computed.

Bicerano defined $N_{rot}$, for a given molecule as the sum of the rotational degrees of freedom of the constituent parts of the molecule being characterized, i.e., the backbone ($N_{BBrot}$) and side groups ($N_{SGrot}$). Bicerano realized that the values taken on by these parameters ($N_{BBrot}$ and $N_{SGrot}$) would depend on the type and physical arrangement of the bonds comprising the molecule since these would dictate the extent to which each can move. A simple set of rules, which are herein incorporated, is used for determining the value of each of $N_{BBrot}$ and $N_{SGrot}$. Moreover, because these rotational degrees of freedom are descriptors of the flexibility for the backbone and side groups of the target molecule, the parameter $N_{rot}$ is itself a measure of the flexibility of the molecule. The rules set out for determining the values of $N_{BBrot}$ and $N_{SGrot}$ are provided below and are based on a knowledge of the molecular structure of the molecule being quantified:

1. Each single bond in the backbone contributes +1 to $N_{BBrot}$, provided that this single bond is not in a ring;
2. Each single bond in a side group, or connecting a side group to the backbone, contributes +1 to $N_{SGrot}$, provided that (a) the rotations of this bond change the coordinates of at least one atom; and (b) this bond is not in a ring;
3. If the coordinates of all atoms remain unchanged upon rotation of a single bond in a side group, or rotation of a single bond connecting a side group to the backbone, such a single bond does not contribute to $N_{SGrot}$;

4. Multiple bonds, either in the backbone or in side groups, do not contribute either to $N_{BBrot}$ or to $N_{SGrot}$;
5. Bonds in "rigid" rings, either in the backbone or in side groups, do not contribute either to $N_{BBrot}$ or to $N_{SGrot}$;
6. Torsional motions around bonds in "floppy" rings are generally more restricted than motions around bonds which are not in rings, but less restricted than motions around bonds in "rigid" (especially aromatic) rings, such that (a) each single bond in a "floppy;' ring in the backbone contributes +0.5 to $N_{BBrot}$; and (b) each single bond in a "floppy" ring in a side group contributes +0.5 to $N_{SGrot}$;
7. Torsional motions around bonds in "semi-floppy" rings, which are fused to rigid rings but are not rigid rings themselves, are taken into account by using the following two rules, i.e., (a) bonds of a semi-floppy ring which are directly bonded to a rigid ring do not contribute to $N_{BBrot}$ or $N_{SGrot}$; and (b) each single bond of the semi-floppy ring which is not directly bonded to any of the rigid rings fused to the semi-floppy ring contributes +0.5 to $N_{BBrot}$ or $N_{SGrot}$, as appropriate; and
8. Lastly, $N_{rot} = N_{BBrot} + N_{SGrot}$.

The magnitude of the parameter $N_{rot}$, therefore, for the polyol and isocyanate resins used herein was obtained by counting the number of freely rotating bonds (excluding rings and multiple bonds) between nearest reactive functional groups of the idealized average structures of the resins available in the manufacturers' published literature. The idealized average structures of the polyol were determined based on the starting composition (sucrose, glycerol or a mixture) and that they were chain extended with propylene oxide. The advertised functionality information, fcn, is used to determine the ratio of sucrose to glycerol. Moreover, the average molecular weight of each molecule is used to calculate the total number of propylene oxide units needed to add to the structure to achieve this final molecular weight. These propylene oxides were evenly distributed around the sucrose and glycerol molecules to result in the idealized average structure used in the $N_{rot}$ calculation. TABLE 1, shown below, summarizes the calculated values of $N_{rot}$ for the two polymer constituents used to provide the foam members of the present invention.

TABLE 1

| Constituent | $N_{rot}$ | fcn | $N_{rot}$/fcn | Avg. MW |
|---|---|---|---|---|
| VORANOL 490 | 9 | 4.3 | 2.09 | 460 |
| ISONATE 181 | 8.5 | 2 | 4.25 | 364 |

Values of $N_{rot}$ and fcn for the polymer constituents used herein

Polyurethane test specimens were prepared, therefore, using diphenylmethane 4,4'-diisocyanate (herein after "MDI") resin instead of the conventional TDI isocyanate resin, and a polyether polyol resin (hereinafter "polyol"), wherein the respective resins have functionality numbers of about 2.0 and 4.3, and average molecular weights of 364 and 460 as shown in TABLE 1. In particular, the MDI and the polyol resins used herein are commercially available materials that can be obtained from Dow Chemical Company (Midland, Mich.) under the respective trade names ISONATE® 181 and VORANOL® 490.

The embodiment of this invention was practiced by first preparing a precursor resin mixture hereinafter referred to as a "prepol." The prepol fundamentally comprises the MDI resin and a small quantity of the polyol, typically in ratios between a maximum of about 7% to about 15% of the stoichiometric amount of the polyol resin necessary to react with the quantity of isocyanate resin present. This is done by adding the small quantity of polyol resin to the larger quantity of the MDI in an inert container such as a glass beaker or flask and mixed. Flowing dry nitrogen gas is used to blanket the resins while mixing in order to minimize the amount of moisture absorbed by the resins. The inert container is then heated externally using a device such as a heating mantle to heat the resins to between about 60° C. to about 85° C. Additional mixing, for up to about 2½ hrs., may be performed while heating if desired after which the mixed resins are sealed under dry nitrogen gas. Once prepared in this manner the material has been found to remain stable for over 12 months if stored in the unopened container.

To prepare the low density foam of the present embodiment, a measured quantity of the polyol resin is added together with a number of minor constituents and mixed by hand with a spatula for about a minute to provide a uniform mixture. The minor components include:

1) a "blowing" agent to react with the isocyanate resin in order to produce $CO_2$;
2) an amine catalyst to promote the reaction between the polyether polyol and the isocyanate resin, particularly a tertiary amine; and
3) an optional surface active agent, or "surfactant," such as any of a number of polysiloxane compounds.

This embodiment used a quantity of distilled water as the blowing agent. Moreover, while there are any of a number of organic solvents such as pentane, isopentane, low molecular weight fluoroalkanes, (e.g. fluorinerts), as well as CFCs and HCFCs that are also effective, it is a stated object of this invention to eliminate the use of CFCs and HCFCs.

Similarly, the present formulation used the tertiary amine 1,8-Diazabicyclo[5.4.0]undec-7-ene ("DBU") sold by Air Products and Chemicals Inc., as the preferred catalyst. Other suitable catalysts, or mixtures of catalysts, for catalyzing the reaction between the polyol resin and the MDI, include tertiary amines such as triethylenediamine and trimethyl N', 2-hydroxyethyl-propylenediamine.

Lastly, numerous suitable surfactants are available and have been found to be satisfactory and of these, the nonionic surface-active agents such as the well-known silicones have been found to be particularly effective. The optional surfactant used in the present embodiment of the invention is a silicone surfactant manufactured by Air Products Inc., under the trade name DC193®.

Finally, once these minor constituents are mixed, a quantity of the prepol mixture equal to about 2.5 to about 3 times the measured quantity of the polyol resin was added and mixed with a small low-shear impeller mixing blade such as a CONN BLADE® (manufactured by Conn and Co., L.L.C., Warren, Pa.) turning at about 1500 rpm for about 1 minute. Stirring in this manner uniformly brings the catalyst, polyol and MDI resins together and initiates polymerization.

After mixing, the resin was poured into a mold providing a "packing factor" of 1, i.e., a mold that allows the urethane foam to fill the mold without constraint. Molding was done at room temperature, but depending on the bulk mass of the mold in comparison to the mass of the foam poured into it, it may be preferred to heat the mold to about 30° C. to avoid "quenching" the polymerization reaction.

To prepare test samples of the foam, a batch weight of about 200 grams of the urethane formulation described above was mixed and about 180 grams of the liquid immediately dispensed into a cylindrical mold measuring about 5.5" in diameter by about 6" in height. The mold was not capped and the foam was allowed to expand in an unconstrained manner.

After foam expansion, the mold was heated to about 66° C.±5° C. for about 12 to 16 hours in order to cure the molded polyurethane foam.

After curing, the molded part is cooled to room temperature and de-molded. Mechanical test samples for compressive strength measurements were then prepared from each of these molded cylindrical samples by first removing about ⅜" from one of the two cylinder faces and then perpendicularly "coring" into the freshly cut cylinder face to a depth of about 2.25". Four such test samples, measuring about 1.6" in diameter, were cut from each of the large cast foam cylinders. After coring the test samples, the uncut face of the cast foam cylinder was removed in the same manner as the first face to release the four core sections. These samples were then completed by sanding the faces flat and parallel such that each of the finished test samples had an overall height of about 2".

Figure 1A:
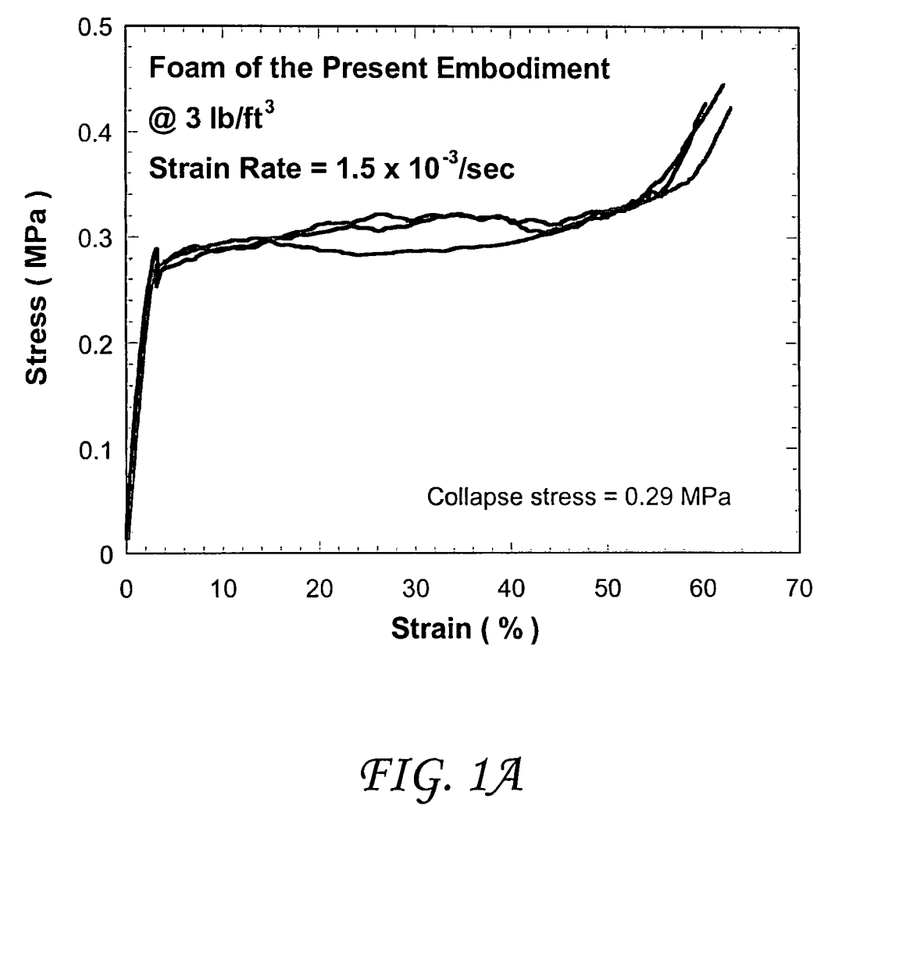
FIG. 1A illustrates the mechanical behavior of a polyurethane foam provided by an embodiment of the present invention at a strain rate of $1.5 \times 10^{-3}$/sec.
Figure 1B:
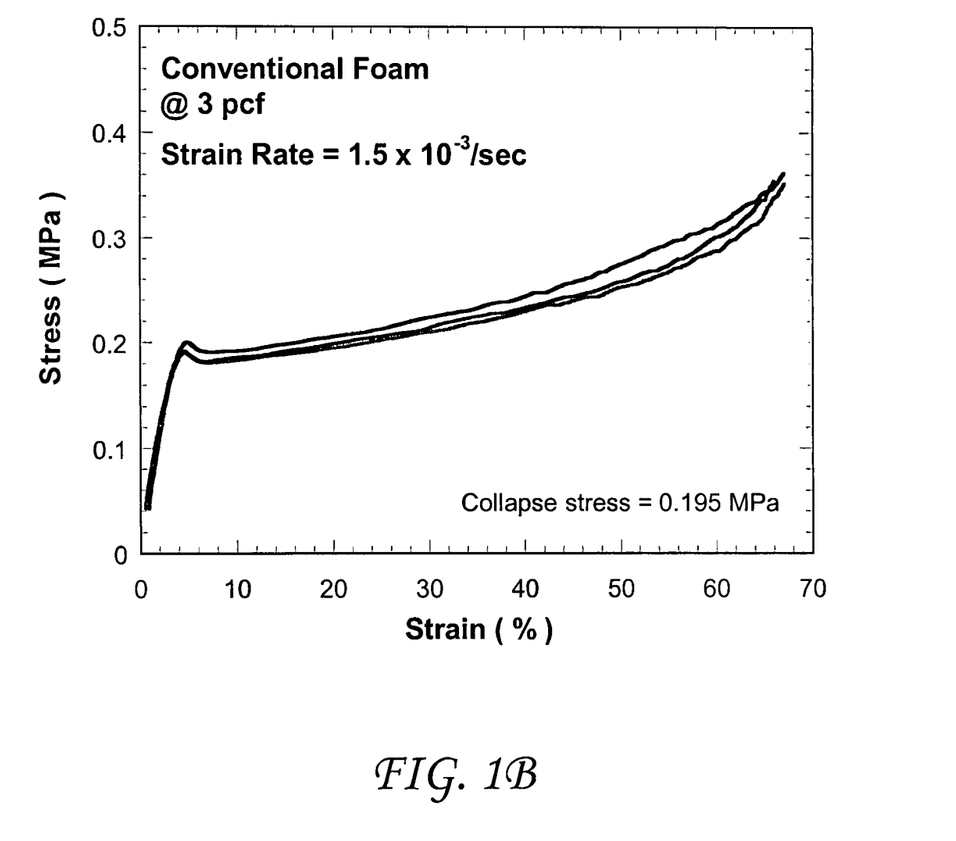
FIG. 1B illustrates the mechanical behavior of a conventional polyurethane foam at a strain rate of $1.5 \times 10^{-3}$/sec.

Each cylindrical specimen was then subjected to low rate mechanical compression loading at a strain rate of about $1.5 \times 10^{-3}$ in/in-sec. The purpose of this testing was to provide a basis for comparing the mechanical properties of the 2-3 lb/ft$^3$ density foam formulation provided by an embodiment of the present invention with that of a conventional, commercially available 3 lb/ft$^3$ density polyurethane formulation. In particular, FIGS. 1A and 1B illustrate the side-by-side comparison of the compression behavior of both of these formulations at a strain rate of $1.5 \times 10^{-3}$ in/in-sec. The abrupt decrease in the rate of loading with increasing imposed strain is referred to as the "collapse stress" and represents the onset of catastrophic, irreversible deformation. For the foam of the current embodiment (FIG. 1A), a collapse stress of 42 lb/in$^2$ (0.29 MPa) is observed. In contrast, for the commercially available foam (FIG. 1B), the collapse stress is shown to be 28 lb/in$^2$ (0.19 MPa). Thus relative to the commercially available, the foam of the current embodiment exhibits a 50% increase in strength for the same density and test conditions.

Figure 2A:
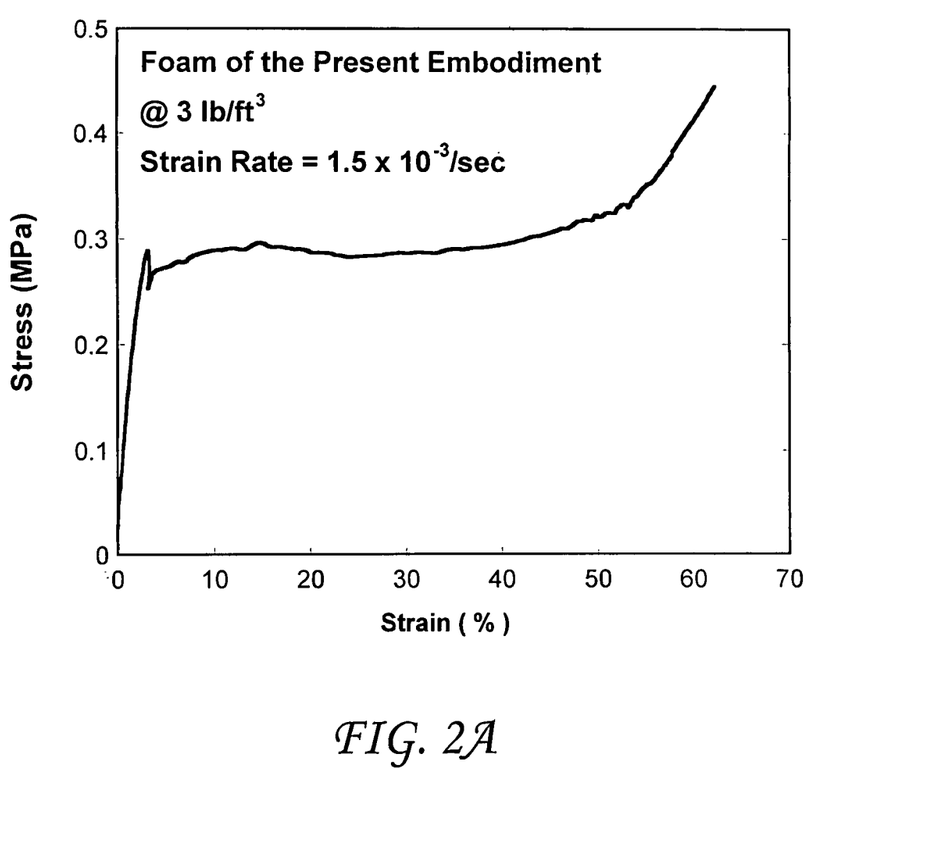
FIG. 2A shows the mechanical behavior of a 3 lb./ft$^3$ polyurethane foam of the embodiment of the present invention at a strain rate of $1.5 \times 10^{-3}$/sec.
Figure 2B:
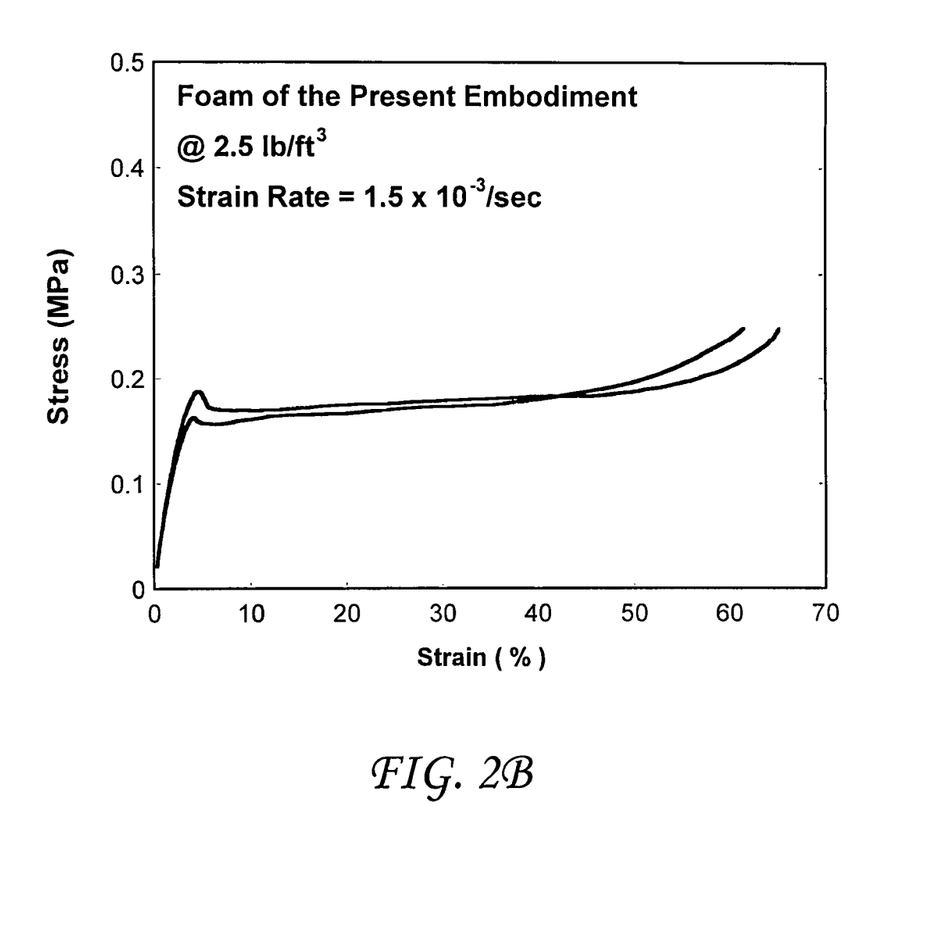
FIG. 2B shows the mechanical behavior of a 2½ lb./ft$^3$ polyurethane foam of the embodiment of the present invention at a strain rate of $1.5 \times 10^{-3}$/sec.
Figure 2C:
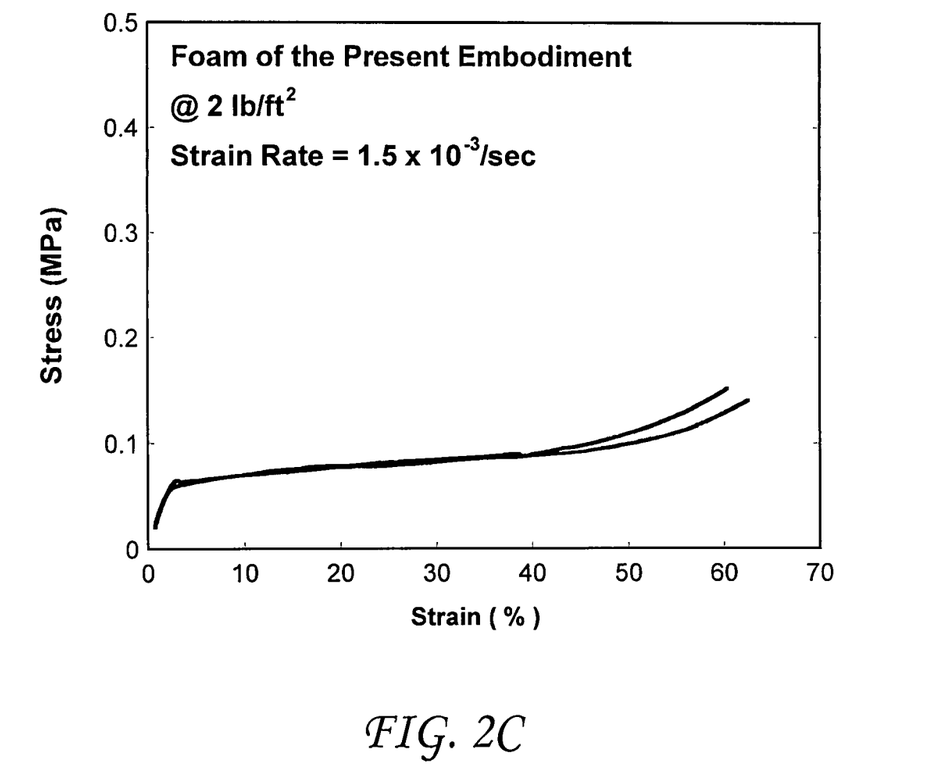
FIG. 2C shows the mechanical behavior of a 2 lb./ft$^3$ polyurethane foam of the embodiment of the present invention at a strain rate of $1.5 \times 10^{-3}$/sec.

FIGS. 2A, 2B and 2C show additional compression data for the foam of the present embodiment decreasing in density from 3 to 2 lbs./ft$^3$. The collapse strength is revealed to decrease progressively as the density of the foam decreases.

Figure 3A:
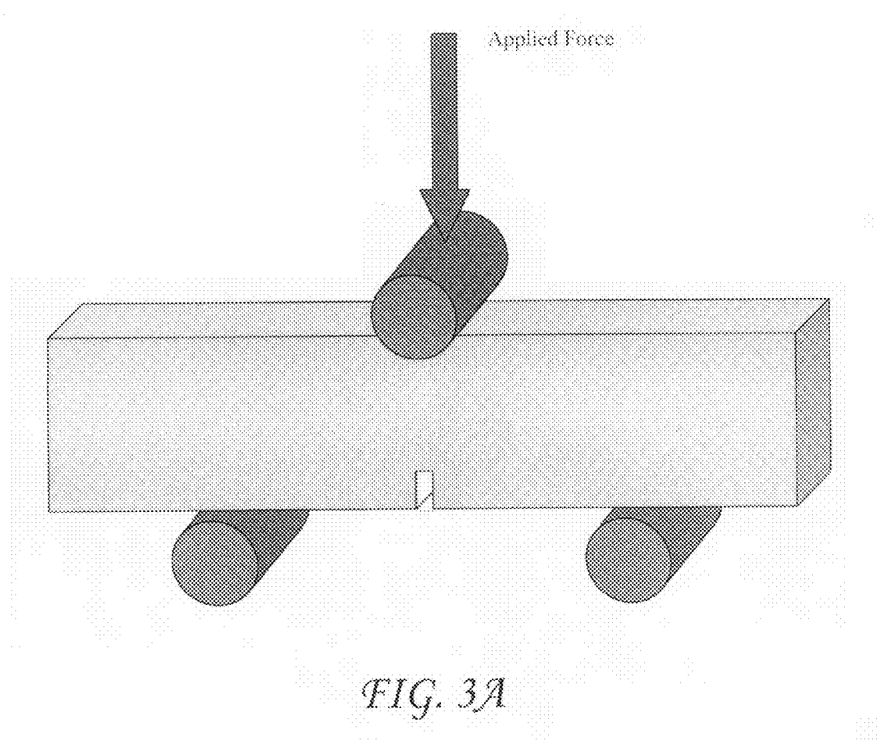
FIG. 3A illustrates the details of the test setup for a 3 point bend test.

Finally, the fracture strength of the polyurethane foam provided by the present embodiments was compared with that of a conventional foam. This was done by preparing rectangular foam specimen bars measuring 3" long×0.45" wide× 0.8" tall. A razor cut notch (or "starter crack") equal to 0.2" was cut into this latter dimension midway along the 3" length of the bar. Such specimens were then placed on a support span and subjected to a bending force as shown in the test setup of FIG. 3A.

Figure 3B:
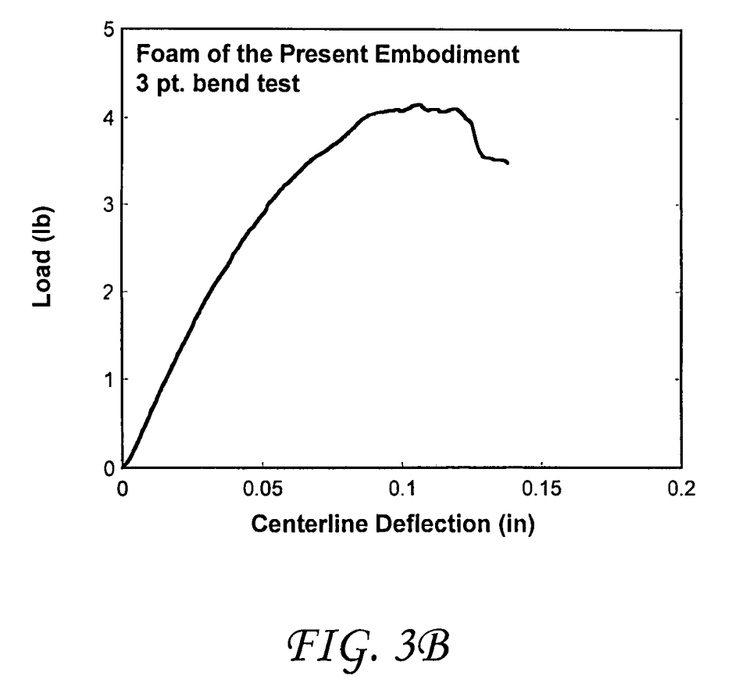
FIG. 3B illustrates the mechanical bending strength of a polyurethane foam provided by an embodiment of the present invention against a 3 point bend test.
Figure 3C:
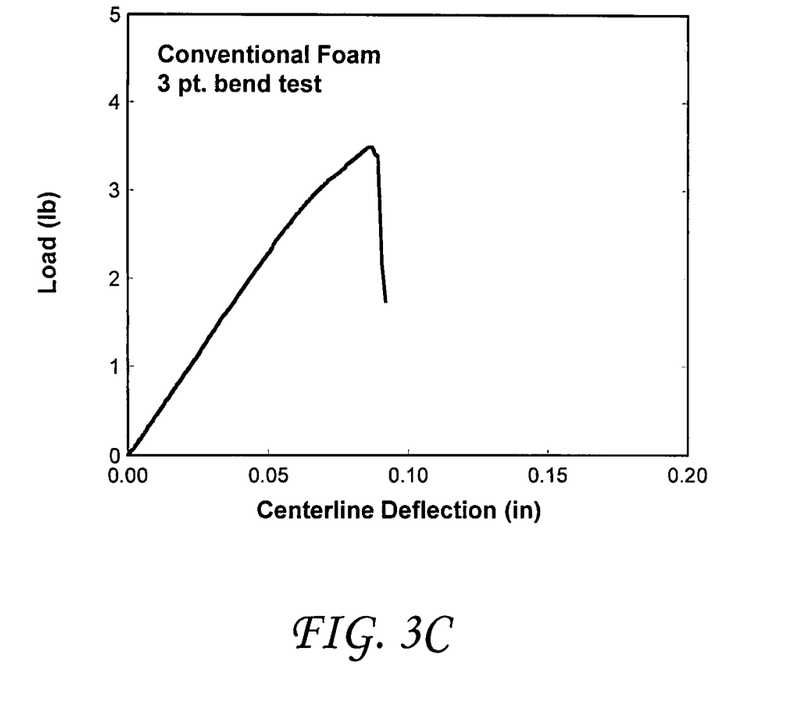
FIG. 3C illustrates the mechanical bending strength of a conventional polyurethane foam against a 3 point bend test.

FIGS. 3B and 3C show side-by-side comparison of fracture strength provided by the 3 point bend test. As shown in FIG. 3B, the foam of the present embodiment fractures at a load that is greater than 4 pounds and at a centerline deflection of approximately 0.14 inches. Furthermore, the foam of the current embodiment exhibits enhanced ductility as evidenced by the end portion of the loading curve prior to fracture as compared with a similar test of a conventional foam. FIG. 3C illustrates that a conventional foam fractures catastrophically at a load of approximately 3.5 pounds after a centerline deflection of less that 0.10 inches.

EXAMPLES

The following examples are provided as a way to better describe the present embodiment. Each includes the formulation used to prepare the polyurethane foam body. Each of the test samples tested was prepared so as to have nominal densities of about 3, 2½ and 2 lbs/ft³.

Example 1

3 lb/ft³

The overall formulation for providing polyurethane foam at 3 lb/ft³ is shown below.

| CONSTITUENT | GRAMS/100 GRAMS OF TOTAL |
| --- | --- |
| ISONATE ® 181 | 67.7 |
| VORANOL ® 490 | 30.0 |
| DC 193 ® | 1.0 |
| DBU | 0.15 |
| WATER | 1.15 |

Of the above materials, the prepol resin mixture comprises the following formulation:

| CONSTITUENT | GRAMS/100 GRAMS OF TOTAL |
| --- | --- |
| VORANOL ® 490 | 4.5 |
| ISONATE ® 181 | 67.7 | and, the final resin mixture, comprises:

| CONSTITUENT | GRAMS/100 GRAMS OF TOTAL |
| --- | --- |
| VORANOL ® 490 | 25.5 |
| DC 193 ® | 1.0 |
| DBU | 0.15 |
| WATER | 1.15 |
| PREPOL RESIN MIX | 72.2 |

FIG. 2A shows the mechanical behavior of a 3 lb./ft³ foam made by this process using the above formulation.

Example 2

2.5 lb/ft³

The overall formulation for providing polyurethane foam at 2½ lb/ft³ is shown below.

| CONSTITUENT | GRAMS/100 GRAMS OF TOTAL |
| --- | --- |
| ISONATE ® 181 | 68.0 |
| VORANOL ® 490 | 29.4 |
| DC 193 ® | 1.0 |
| DBU | 0.17 |
| WATER | 1.39 |

Of the above materials, the prepol resin mixture comprises the following formulation:

| CONSTITUENT | GRAMS/100 GRAMS OF TOTAL |
| --- | --- |
| VORANOL ® 490 | 4.4 |
| ISONATE ® 181 | 68.0 | and, the final resin mixture, comprises:

| CONSTITUENT | GRAMS/100 GRAMS OF TOTAL |
| --- | --- |
| VORANOL ® 490 | 25.0 |
| DC 193 ® | 1.0 |
| DBU | 0.17 |
| WATER | 1.39 |
| PREPOL RESIN MIX | 72.4 |

FIG. 2B shows the mechanical behavior of a 2½ lb./ft³ foam made by this process using the above formulation.

Example 3

2 lb/ft³

The overall formulation for providing polyurethane foam at 2 lb/ft³ is shown below.

| CONSTITUENT | GRAMS/100 GRAMS OF TOTAL |
| --- | --- |
| ISONATE ® 181 | 68.6 |
| VORANOL ® 490 | 28.5 |
| DC 193 ® | 1.0 |
| DBU | 0.17 |
| WATER | 1.74 |

Of the above materials, the prepol resin mixture comprises the following formulation,

| CONSTITUENT | GRAMS/100 GRAMS OF TOTAL |
| --- | --- |
| VORANOL ® 490 | 4.3 |
| ISONATE ® 181 | 68.6 | and, the final resin mixture, comprises:

| CONSTITUENT | GRAMS/100 GRAMS OF TOTAL |
| --- | --- |
| VORANOL ® 490 | 24.2 |
| DC 193 ® | 1.0 |
| DBU | 0.17 |
| WATER | 1.74 |
| PREPOL RESIN MIX | 72.9 |

FIG. 2C shows the mechanical behavior of a 2 lb./ft³ foam made by this process using the above formulation.

Finally, because it is believed that the operative factors for providing the low density polyurethane foam of the present embodiments is dependent upon constituent materials having a low number of functional groups per monomer (fcn) and high rotational degrees of freedom ($N_{rot}$), other commercially available polyol/isocyanate product combinations that exhibit these same properties are likely candidates for providing a low density polyurethane foam. As such, the specific recited materials are intended to be illustrative only and not to be limiting in any way.

Therefore, while the particular formulations as described herein are fully capable of attaining the objects of this embodiment, it is to be understood that they are the presently preferred embodiments of the present invention and are thus representative of the subject matter which is broadly contemplated by the present invention, that the scope of the present invention is intended to encompass those other embodiments which may become obvious to those skilled in the art, and that the scope of the present invention is accordingly to be limited by nothing other than the appended claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for". All material quantities and amounts are in parts by weight, or by weight percentages, unless otherwise indicated.

We claim:

1. A process for providing a high strength, low density polyurethane foam structure, comprising:
   a) mixing a quantity of a diphenylmethane diisocyanate resin to a first quantity of a sucrose/glycerine initiated polyether polyol under an inert atmosphere to form a first precursor resin (hereinafter a prepol) mixture, wherein the first quantity of the polyether polyol is chosen to be an amount equal to about 7% to about 15% of the stoichiometric amount necessary to react with the quantity of diphenylmethane diisocyanate resin;
   b) heating the prepol mixture to a temperature between about 60° C. and about 85° C.;
   c) separate from the mixing to form a prepol mixture, combining a second quantity of the sucrose/glycerine initiated polyether polyol, a quantity of a tertiary amine, a quantity of a surface active agent, and a quantity of a blowing agent consisting essentially of water to provide a second precursor mixture, wherein the quantity of blowing agent comprises a quantity sufficient to provide a polyurethane foam structure having a density of between about 2 lbs/ft$^3$ and about 4 lbs/ft$^3$;
   d) mixing a quantity of the prepol mixture to the separately combined second precursor mixture equal to about 2.5 times to 3 times the second quantity of sucrose/glycerin initiated polyol to form a foam gel and to initiate a polymerization reaction; and
   e) dispensing the foam gel into a heated mold and allowing the polymerization reaction to continue and expand into the heated mold thereby forming the polyurethane foam.

2. The process of claim 1, wherein the sum of the first and second quantities of the polyether polyol comprise a stoichiometric amount necessary to react with the quantity of the diphenylmethane diisocyanate resin.

3. The process of claim 2, further including the step of heating the mold and the expanded foam to about 65° C. from about 12 hours to about 16 hours thereby providing a cured foam member.

4. The process of claim 3, further including the steps of cooling said mold and said cured foam member to room temperature, and removing said cured foam member from said mold thereby providing the low density polyurethane foam structure.

* * * * *